(12) United States Patent
Miyata et al.

(10) Patent No.: US 7,340,115 B2
(45) Date of Patent: Mar. 4, 2008

(54) OPTICAL WAVELENGTH TUNABLE FILTER

(75) Inventors: Hiroshi Miyata, Kawasaki (JP); Yukito Tsunoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/287,394

(22) Filed: Nov. 28, 2005

(65) Prior Publication Data

US 2007/0031082 A1 Feb. 8, 2007

(30) Foreign Application Priority Data

Aug. 8, 2005 (JP) ............................. 2005-229825

(51) Int. Cl.
*G02F 1/335* (2006.01)

(52) U.S. Cl. ........................................................ 385/7

(58) Field of Classification Search ...................... None
See application file for complete search history.

(56) References Cited

U.S. PATENT DOCUMENTS 6,400,881 B1 * 6/2002 Seino et al. ................. 385/130

FOREIGN PATENT DOCUMENTS

| JP | 8-211349 | 8/1996 |
|---|---|---|
| JP | 2004-219589 | 8/2004 |

* cited by examiner

*Primary Examiner*—Sung Pak
*Assistant Examiner*—Hoang Tran
(74) *Attorney, Agent, or Firm*—Staas & Halsey LLP

(57) ABSTRACT

In an optical wavelength tunable filter (AOTF) using an acousto-optic effect of the present invention, there is provided a single SAW waveguide which propagates a surface acoustic wave generated by an IDT along respective arm portions of an optical waveguide. The SAW waveguide is formed with a pair of low sound-velocity areas having a curved belt shape, in which a mode distribution of a propagating SAW is changed symmetrically with respect to a straight line as an axis passing through the middle of the respective arm portions, while keeping the sound velocity of the SAW constant. As a result, wavelength dependence and polarization dependence of the filter property, and an increase in sidelobe level, generated due to weighting of the SAW intensity, can be suppressed.

12 Claims, 12 Drawing Sheets

CONVENTIONAL AOTF USING DIRECTIONAL COUPLER

CONVENTIONAL AOTF USING OBLIQUE SAW GUIDE

CONVENTIONAL AOTF USING CURVED SAW GUIDE

PROBLEM IN CONVENTIONAL AOTF USING DIRECTIONAL COUPLER (a) SELECT SHORT WAVELENGTH (b) SELECT LONG WAVELENGTH

PROBLEM IN CONVENTIONAL AOTF USING OBLIQUE SAW GUIDE

PROBLEM IN CONVENTIONAL AOTF USING CURVED SAW GUIDE

OPTICAL WAVELENGTH TUNABLE FILTER

BACKGROUND OF THE INVENTION (1) Field of the Invention

The present invention relates to an optical wavelength tunable filter using an acousto-optic effect, and more specifically, relates to an optical wavelength tunable filter which weights the intensity of a surface acoustic wave (SAW) which interacts with light.

(2) Related Art

In the optical wavelength tunable filter (AOTF) using the acousto-optic effect, weighting of the SAW intensity may be performed in an interactive area between light and the SAW, in order to suppress sidelobe in the filter property. As a weighting method in the conventional AOTF, for example, one using a SAW directional coupler, an oblique SAW guide, or a curved SAW guide is known (for example, see Japanese Unexamined Patent Publication No. 2004-219589 and 8-211349).

FIG. 18 is a block diagram showing one example of the conventional AOTF using a SAW directional coupler. In this AOTF, an optical waveguide 102 is formed on a substrate 101 comprising for example $LiNbO_3$, the SAW generated on the surface of the substrate 101 by an interdigital transducer (IDT) 103 propagates on a directional coupler 104 formed along two parallel arm portions of the optical waveguide 102, and the light propagating on the respective arm portions of the optical waveguide 102 interacts with the SAW propagating on the directional coupler 104, thereby obtaining a required filter property. The directional coupler 104 has a SAW waveguide 104A formed on the respective arm portions of the optical waveguide 102, and a SAW waveguide 104B formed with a predetermined gap from the SAW waveguide 104A, so that the SAW given to the SAW waveguide 104B from the IDT 103 moves to the SAW waveguide 104A due to the directional coupling and then returns to the SAW waveguide 103B again, thereby weighting of the SAW intensity in the interactive area between the light and the SAW, to realize suppression of sidelobe in the filter property.

FIG. 19 is a block diagram showing one example of the conventional AOTF using an oblique SAW guide. In this AOTF, a SAW waveguide 105 guiding the SAW generated on the surface of the substrate 101 by the IDT 103 along the optical waveguide 102, is formed in an oblique direction with respect to the longitudinal direction of the optical waveguide 102. By weighting a coupling coefficient between the light propagating on the respective arm portions of the optical waveguide 102, and the SAW propagating on the SAW waveguide 105, suppression of sidelobe in the filter property is realized.

FIG. 20 is a block diagram showing one example of the conventional AOTF using a curved SAW guide. In the AOTF, for example, a straight optical waveguide 112 is formed on a substrate 111, and the SAW generated on the surface of the substrate 111 by the IDT 113 propagates on a curved area (SAW guide) placed between a pair of SAW walls 114A and 114B. Since the light propagating on the optical waveguide 112 interacts with the SAW propagating on the curved SAW guide, a required filter property can be obtained. In the AOTF using such a curved SAW guide, the intensity of the SAW interacting with the light gradually increases in the propagation direction of the light and then gradually decreases after having reached the maximum value, thereby realizing suppression of sidelobe in the filter property.

However, in the conventional AOTF there are problems in; the wavelength dependence of the filter property generated because the coupling length of the light and the SAW depends on the wavelength of the SAW, the polarization dependence of the filter property generated due to the asymmetry of weighting with respect to TE/TM mode lights respectively propagating on the respective arm portions of an optical waveguide, or an increase in sidelobe generated due to nonuniformity in sound-velocity distribution.

Specifically, in the conventional AOTF using the directional coupler shown in FIG. 18, for example as shown in the upper part of FIG. 21, the intensity distribution of the SAW with respect to the propagation direction of the light (in the y-axis direction in FIG. 18) becomes different, in the case of selecting the light (a) on the short wavelength side and (b) on the long wavelength side by the AOTF, due to different wavelengths of the SAW. Accordingly, the filter property of the AOTF has wavelength dependence, as shown in the lower part of FIG. 21, with the sidelobe generated at the time of selecting the short wavelength increasing as compared with the sidelobe generated at the time of selecting the long wavelength.

In the conventional AOTF using the oblique SAW guide shown in FIG. 19, since a discrepancy occurs in weighting with respect to the respective arm portions (the TE waveguide and the TM waveguide) of the optical waveguide, then for example as shown in the upper part of FIG. 22, the SAW intensity distribution on the TE waveguide becomes different from the SAW intensity distribution on the TM waveguide. Therefore, the filter property of the AOTF has a polarization dependence resulting from the refractive index distribution of the optical waveguide, thereby causing a polarization dependence loss (PDL) as shown in the lower part of FIG. 22.

Further, in the conventional AOTF using the curved SAW guide shown in FIG. 20, the sound velocity in the SAW propagation mode changes corresponding to the width of the SAW guide, so as to have a sound-velocity distribution with respect to the propagation direction of light. Accordingly, the filter property of the AOTF becomes such that an increase in sidelobe level occurs due to the sound-velocity distribution, for example, as shown by the solid line in FIG. 23, as compared with a case in which the sound velocity in the SAW propagation mode is uniform as shown by the dotted line.

SUMMARY OF THE INVENTION

In view of the above background, it is an object of the present invention to provide an optical wavelength tunable filter using the acousto-optic effect, which can solve the problems of wavelength dependence and polarization dependence of the filter property generated due to weighting of the SAW intensity, and can obtain a desired filter property by suppressing an increase in sidelobe level resulting from the sound-velocity distribution in the SAW propagation mode.

To achieve the above object, the optical wavelength tunable filter of the present invention comprises: a substrate having an acousto-optic effect; an optical waveguide formed on the substrate; a surface acoustic wave generating unit that generates a surface acoustic wave on the substrate; and a single surface acoustic waveguide, to one end of which a surface acoustic wave from the surface acoustic wave generating unit is provided, so as to propagate the surface acoustic wave along the optical waveguide. In this optical wavelength tunable filter, the optical waveguide comprises:

a separation section for separating a light input to an input port into two polarized waves; two parallel arm portions respectively provided with the light separated by the separation section; and a mode conversion section for converting the polarization mode of the selected light which has propagated on the respective arm portions, and outputting the selected light from an output port. The surface acoustic waveguide includes an area in which a mode distribution of a propagating surface acoustic wave is changed symmetrically with respect to a straight line as an axis passing through the middle of the respective arm portions of the optical waveguide, while keeping the sound velocity of the surface acoustic wave constant, so that the intensity of the surface acoustic wave interacting with the light propagating on the respective arm portions of the optical waveguide is changed with respect to a propagation direction of the light.

In the optical wavelength tunable filter having such a configuration, the surface acoustic wave generated by the surface acoustic wave generating unit is provided to one end of the single surface acoustic waveguide, and propagates along the respective arm portions of the optical waveguide. The mode distribution of the surface acoustic wave propagating on the surface acoustic waveguide is changed symmetrically with respect to a straight line as an axis passing through the middle of the respective arm portions, while the sound velocity thereof is kept constant, thereby enabling weighting of the intensity of the surface acoustic wave interacting with the light propagating on the respective arm portions.

Moreover, as one aspect of the optical wavelength tunable filter, the following configuration may be used. That is, the surface acoustic waveguide is positioned symmetrically with respect to a straight line as an axis passing through the middle of the respective arm portions of the optical waveguide, and has a pair of low sound-velocity areas having a curved belt shape, in which the sound velocity of the surface acoustic wave propagating on the substrate becomes slower relative to the sound velocity in other areas. The width of the respective low sound-velocity areas may be set according to a gap between the pair of low sound-velocity areas, so that the sound velocity of the surface acoustic wave propagating in the surface acoustic waveguide becomes constant.

In such a configuration, the pair of low sound-velocity areas having the curved belt shape is formed symmetrically with respect to the center line of the respective arm portions of the optical waveguide, and the width of the respective low sound-velocity areas is set according to the gap between the low sound-velocity areas. As a result, even when the mode distribution of the surface acoustic wave changes due to a change in the gap between the low sound-velocity areas with respect to the propagation direction of the light, the sound velocity can be kept constant.

As a specific configuration of the optical wavelength tunable filter, the respective low sound-velocity areas may be such that a central portion thereof in the longitudinal direction overlaps on the respective arm portions of the optical waveguide, and opposite end portions are located outside or inside of the respective arm portions of the optical waveguide. By having such a shape, the intensity of the surface acoustic wave interacting with the respective arm portions of the optical waveguide is weighted so that the intensity thereof increases most in the central portion in the longitudinal direction of the surface acoustic waveguide.

Moreover, the respective low sound-velocity areas can be obtained by forming a thin film, which slows the sound velocity of the surface acoustic wave propagating on the substrate, on the surface of the substrate corresponding to the low sound-velocity areas, or by forming a thin film, which quickens the sound velocity of the surface acoustic wave propagating on the surface of the substrate, on the surface of the substrate excluding the surfaces corresponding to the low sound-velocity areas. Moreover, the respective low sound-velocity areas can be obtained by a combination of the thin film that slows the sound velocity of the surface acoustic wave, and the thin film that quickens the sound velocity of the surface acoustic wave.

In addition, as a specific configuration of the optical wavelength tunable filter, the surface acoustic wave generating unit may have one interdigital transducer, which excites the surface acoustic wave commonly provided to the one end of the respective low sound-velocity areas. Moreover, the surface acoustic wave generating unit may have a pair of interdigital transducers which excites an in-phase or an anti-phase surface acoustic wave, individually provided to the one end of the respective low sound-velocity areas. When the surface acoustic wave generating unit has a pair of interdigital transducers corresponding to the respective low sound-velocity areas, a coupling loss of the surface acoustic wave provided from the respective interdigital transducers to the one end of the corresponding low sound-velocity areas can be reduced.

According to the optical wavelength tunable filter of the present invention, substantially the identically weighted surface acoustic waves interact with the light propagating on the respective arm portions of the optical waveguide, and the sound velocity of the surface acoustic wave propagating on the single surface acoustic waveguide can be kept constant. As a result, the conventional problems, namely the wavelength dependence and the polarization dependence of the filter property, and an increase in sidelobe level resulting from the sound-velocity distribution of the surface acoustic wave can be solved, thereby enabling realization of a desired filter property very easily.

Other objects, features and advantages of the present invention will become apparent from the following explanation of embodiments with reference to the accompanying drawings.

DETAILED DESCRIPTION OF THE INVENTION

The best mode for carrying out the present invention will be described with reference to the accompanying drawings. The same reference symbols refer to the same or equivalent parts throughout the figures.

Figure 1:
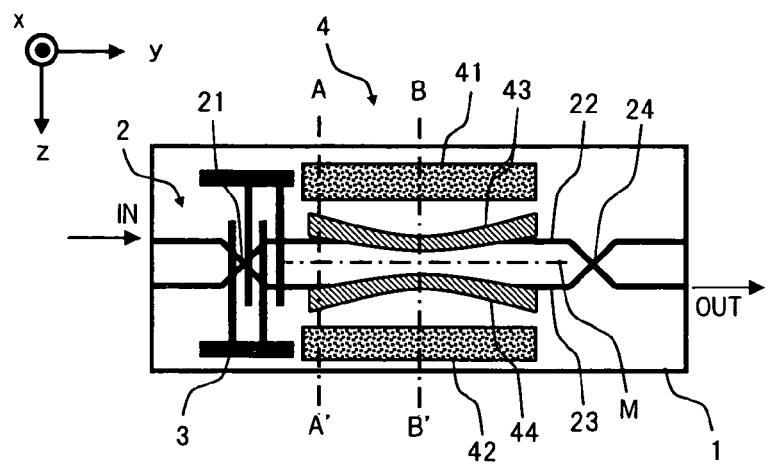
FIG. 1 is a top view showing the configuration of an optical wavelength tunable filter according to a first embodiment of the present invention.
Figure 2:
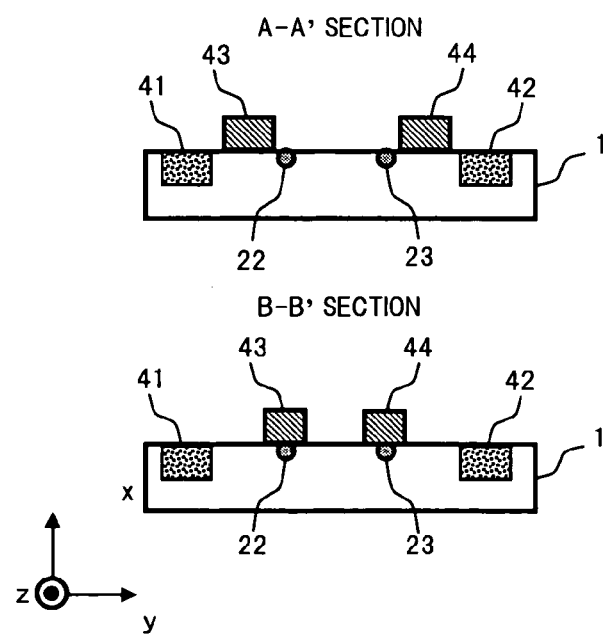
FIG. 2 is a diagram showing the configuration of the A-A' section and the B-B' section of FIG. 1.

FIG. 1 is a top view showing the configuration of an optical wavelength tunable filter according to a first embodiment of the present invention. FIG. 2 is a diagram showing the configuration of the A-A' section and the B-B' section of FIG. 1.

In FIG. 1 and FIG. 2, the optical wavelength tunable filter (AOTF) using the acousto-optic effect of the present invention, includes; a substrate 1 having the acousto-optic effect, for example, an x-cut lithium niobate ($LiNbO_3$) substrate, an optical waveguide 2 formed on the substrate 1, an interdigital transducer (IDT) 3 serving as a surface acoustic wave generating unit for generating a surface acoustic wave (SAW) on the substrate 1, and a single SAW waveguide 4, to one end of which the SAW from the IDT 3 is provided, so as to propagate the SAW along the optical waveguide 2.

The optical waveguide 2 is a general optical waveguide formed in the vicinity of the surface within the substrate 1, for example, by titanium (Ti) diffusion or the like. The optical waveguide 2 has; a separation section 21 for separating the light input to an input port IN into two polarized waves, two parallel arm portions 22 and 23 respectively provided with the light separated by the separation section 21, and a mode conversion section 24 for converting the polarization mode of the selected lights which have propagated on the respective arm portions, and outputting the selected light from an output port OUT.

The IDT 3 is formed on the surface of the substrate 1 positioned in the vicinity of the separation section 21 of the optical waveguide 2, and when an RF signal (not shown) having a frequency set corresponding to a selected wavelength of the AOTF is applied from the outside, generates a SAW having a wavelength corresponding to the frequency of the RF signal.

The SAW waveguide 4 is formed by providing a pair of SAW walls 41 and 42 formed by titanium (Ti) diffusion or the like, in the substrate 1 at positions away from the respective arm portions 22 and 23 of the optical waveguide 2 by a required distance, and designating a single area placed between the SAW walls 41 and 42 as a waveguide of the SAW from the IDT 3. On the surface of the substrate 1 positioned in the area placed between the SAW walls 41 and 42, a pair of thin films 43 and 44 having a curved belt shape are formed symmetrically with respect to a straight line M as an axis passing through the middle of the respective arm portions 22 and 23 of the optical waveguide 2. Of the respective thin films 43 and 44, the central portion in the longitudinal direction is located on the respective arms portions 22 and 23 of the optical waveguide 2, and the opposite end portions are located outside of the respective arm portions 22 and 23 of the optical waveguide 2. For the material for the respective thin films 43 and 44, for example, indium (In)-doped silicon oxide film ($SiO_2$) is used. By forming such thin films 43 and 44 on the surface of the substrate 1, the sound velocity of the SAW propagating in the substrate 1 located below the respective thin films becomes slower than the sound velocity of the SAW propagating on the portion where the thin films 43 and 44 are not formed. Accordingly, the curved belt-shaped area of the substrate 1 corresponding to the respective thin films 43 and 44 becomes the low sound-velocity area where the sound velocity of the SAW becomes slower relative to other areas.

Here, the mode distribution of the SAW propagating on the SAW waveguide 4 will be described in detail.

The SAW generated by the IDT 3 is guided to one end of the area placed between the SAW walls 41 and 42, so as to propagate along the respective arm portions 22 and 23 of the optical waveguide 2. At this time, since the low sound-velocity areas in the curved belt shape are formed in the area where the SAW propagates, by the respective thin films 43 and 44 formed on the surface of the substrate 1, the mode distribution of the SAW propagating on the SAW waveguide 4 changes in the propagation direction. Specifically, as shown on the upper left in FIG. 1, when it is assumed that the propagation direction of light propagating on the respective arm portions 22 and 23 of the optical waveguide 2 is the y axis, the mode distribution of the SAW propagating on the SAW waveguide 4, that is, the distribution of the SAW in an x-z plane perpendicular to the y axis changes continuously with respect to the y-axis direction.

Figure 3:
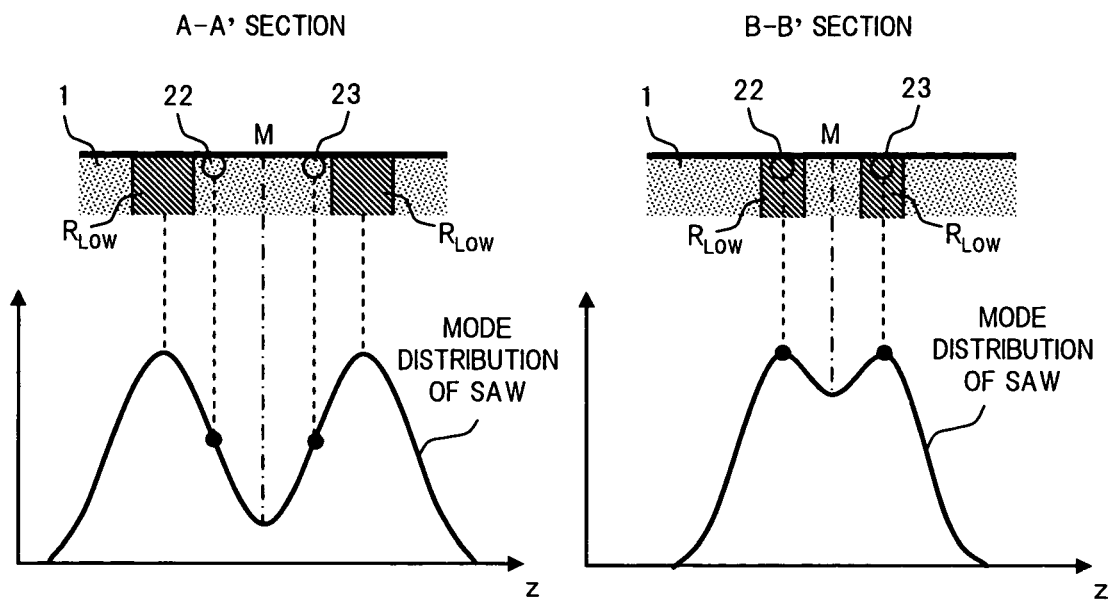
FIG. 3 is a diagram showing a mode distribution of a SAW on the A-A' section and the B-B' section in the first embodiment.

FIG. 3 is a diagram showing the mode distribution of the SAW on the A-A' section and the B-B' section in FIG. 1. On the A-A' section, as shown on the upper left in FIG. 3, the pair of low sound-velocity areas $R_{LOW}$ formed in the substrate 1 is located on the outside of the optical waveguides 22 and 23. Therefore, the mode distribution of the SAW becomes, as shown on the lower left in FIG. 3, such that there are peaks at positions corresponding to the respective low sound-velocity areas $R_{LOW}$ in the z-axis direction, and hence, the intensity of the SAW interacting with the light propagating on the optical waveguides 22 and 23 becomes relatively low. On the other hand, on the B-B' section, as shown on the upper right in FIG. 3, the pair of low sound-velocity areas $R_{LOW}$ overlaps on the optical waveguides 22 and 23. Therefore, the mode distribution of the SAW becomes, as shown on the lower right in FIG. 3, such that there are peaks at positions corresponding to the optical waveguides 22 and 23 in the z-axis direction, and hence, the intensity of the SAW interacting with the light propagating on the optical waveguides 22 and 23 is maximized.

Figure 4:
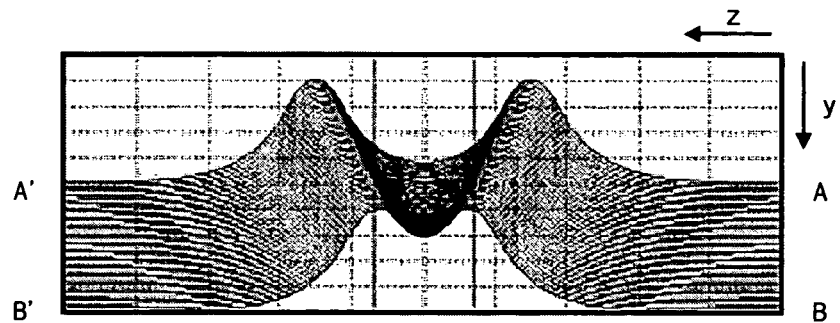
FIG. 4 is a diagram showing the result of continuous calculation of the mode distribution of the SAW from the A-A' section to the B-B' section in the first embodiment.

FIG. 4 is a diagram showing an example in which the mode distribution of the SAW is calculated continuously from the A-A' section to the B-B' section. Here the calculation of the mode distribution assumes that the respective low sound-velocity areas $R_{LOW}$ have an approximately straight shape bended at the central portion. As shown in the figure, it is seen that in this AOTF, the mode distribution of the SAW propagating on the SAW waveguide 4 changes continuously in the y-axis direction. The change in the mode distribution from the B-B' section to the end opposite to the A-A' section has a symmetric relation to that of FIG. 4, and hence illustration is herein omitted.

Figure 5:
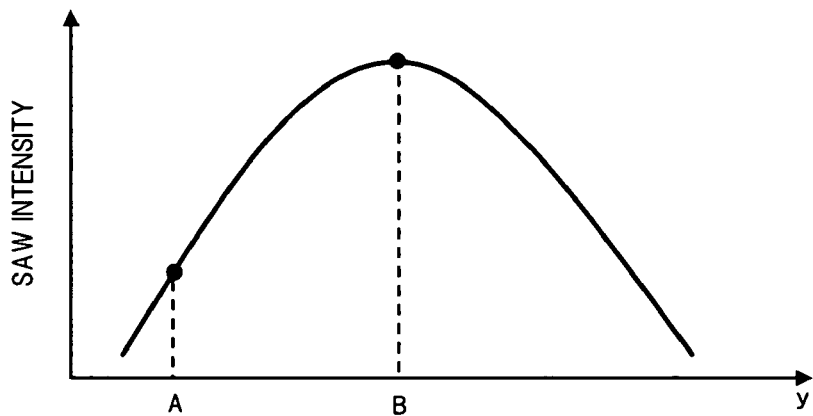
FIG. 5 is a diagram showing a change in the SAW intensity in a y-axis direction in the first embodiment.

FIG. 5 is a diagram showing a change in the SAW intensity in the y-axis direction. Thus, in the AOTF, the intensity of the SAW interacting with the light propagating on the respective arm portions 22 and 23 of the optical waveguide 2 gradually increases in the y-axis direction, and then gradually decreases after reaching the maximum value. In other words, weighting of the SAW intensity capable of suppressing the sidelobe in the filter property is performed. By weighting of the SAW intensity in the AOTF, since the pair of curved belt-shaped low sound-velocity areas $R_{LOW}$ is formed symmetrically with respect to the center line M of the respective arm portions 22 and 23, the coupling length of the light and the SAW does not depend on the SAW wavelength, as in the case of the conventional AOTF using the directional coupler, and hence a filter property that does not depend on the selected wavelength can be obtained. Moreover, since asymmetry does not occur in weighting with respect to the respective arm portions, as in the conventional AOTF using the oblique SAW guide, a filter property that does not depend on polarization can be realized.

As explained in the conventional AOTF using the curved SAW guide, when the width of the single SAW waveguide is changed, the sound velocity of the SAW (propagation speed) changes. Such a change in the sound velocity of the SAW can also occur in the AOTF when the gap between the pair of low sound-velocity areas $R_{LOW}$ is changed, thereby causing a deterioration in the filter property such as an increase in sidelobe level. Therefore in the AOTF, the width of the low sound-velocity areas $R_{LOW}$ is optimized according to the gap between the pair of low sound-velocity areas $R_{LOW}$, thereby enabling application of the configuration for keeping the sound velocity of the SAW constant.

Figure 6:
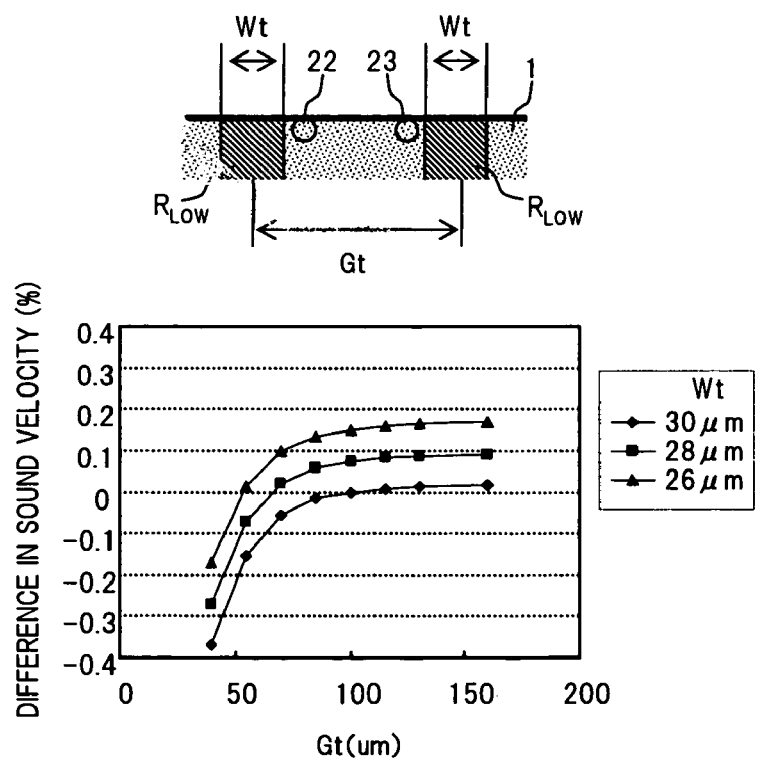
FIG. 6 is a diagram exemplifying a change in the sound velocity of the SAW when the width of and the gap between a pair of low sound-velocity areas are changed in the first embodiment.

FIG. 6 is a diagram exemplifying a change in the sound velocity of the SAW when the width of and the gap between the pair of low sound-velocity areas $R_{LOW}$ are changed. Here, it is assumed that the width of the respective low sound-velocity areas $R_{LOW}$ is Wt, the gap between the low sound-velocity areas $R_{LOW}$ is Gt, and a difference in sound velocity under other conditions is expressed in percentage (%), using the sound velocity when Wt is 30 μm, and Gt is 100 μm as a reference (the difference in sound velocity is zero).

Figure 7:
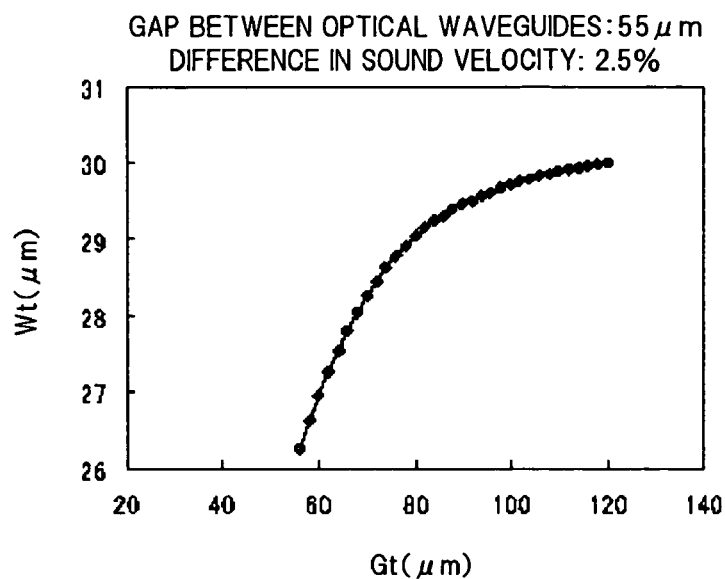
FIG. 7 is a diagram showing one example of calculation of the relation between the width of and the gap between the low sound-velocity areas for keeping the sound velocity of the SAW constant in the first embodiment.

From FIG. 6, it is seen that when the width Wt of the low sound-velocity areas $R_{LOW}$ is constant, as the gap Gt becomes narrower, the difference in sound velocity increases. However, by changing the width Wt according to the gap Gt, a condition under which the sound velocity becomes constant can be obtained. For example, in the case where the gap between the respective arm portions 22 and 23 of the optical waveguide 2 is 55 μm, and low sound-velocity areas $R_{LOW}$ in which the sound velocity of the SAW slows by 2.5% are formed, if the width Wt of and the gap Gt between the low sound-velocity areas $R_{LOW}$ for keeping the sound velocity of the SAW constant are calculated, the relationship as shown in FIG. 7 can be derived. However, it is not intended that the present invention is limited to the example. According to such a relationship, the width Wt of and the gap Gt between the low sound-velocity areas $R_{LOW}$, specifically, the width of and the gap between the respective thin films 43 and 44 formed on the surface of the substrate 1 are designed, so as to keep the sound velocity of the SAW propagating on the SAW waveguide 4 constant, thereby obtaining an excellent filter property with an increase in sidelobe level suppressed.

In the AOTF having the above-described configuration, the light provided to the input port IN is separated into a TE mode light and a TM mode light in the separation section 21 of the optical waveguide 2, and the respective mode lights propagate on the respective arm portions 22 and 23 respectively. At this time, since an RF signal having a frequency corresponding to the desired selected wavelength is applied to the IDT 3, the SAW is excited in the substrate 1, and the SAW from the IDT 3 propagates on the SAW waveguide 4 in a mode distribution changing in the aforementioned y-axis direction. As a result, the light propagating on the respective arm portions 22 and 23 of the optical waveguide 2 is subjected to weighting of the SAW intensity as shown in FIG. 5, and the light interacts with the SAW whose sound velocity is kept constant. Then the respective lights which have passed through the respective arm portions 22 and 23 are mode converted in the mode conversion section 24, and hence light of the desired selected wavelength is output from the output port OUT.

In this manner, according to the AOTF in the first embodiment, since weighting of the SAW intensity is performed without depending on the selected wavelength, the wavelength dependence of the filter property can be dissolved. Moreover, since the SAW subjected to the identical weighting interacts with the TE/TM mode lights propagating on the respective arm portions 22 and 23, the polarization dependence of the filter property can be also dissolved. Furthermore, since the sound velocity of the SAW propagating on the SAW waveguide 4 is kept constant, an increase in sidelobe level resulting from the sound velocity distribution in the SAW propagation mode can be dissolved as well. As a result, an AOTF having excellent filter properties can be realized.

Figure 8:
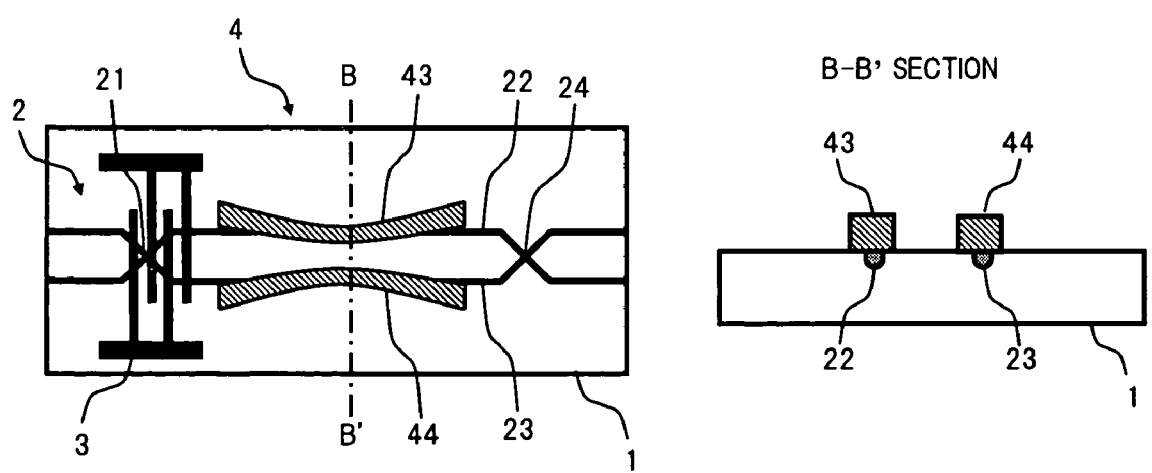
FIG. 8 is a diagram associated with the first embodiment showing another configuration example in which a SAW wall is omitted.

In the first embodiment, a configuration example is shown in which the area placed between the pair of SAW walls 41 and 42 is designated as the SAW waveguide. However, for example as shown in FIG. 8, by omitting the SAW walls 41 and 42, the configuration of the AOTF can be simplified. However, if the SAW walls 41 and 42 are provided, the confinement effect of the SAW increases, thereby enabling reduction in the exciting power of the SAW, suppression of SAW leakage in an integrated device, and high integration.

Figure 9:
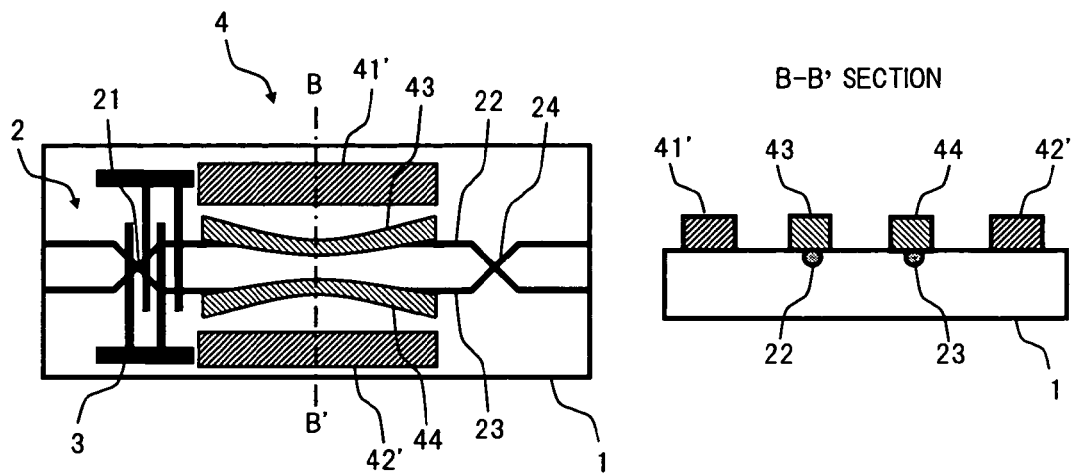
FIG. 9 is a diagram associated with the first embodiment showing another configuration example in which the SAW wall is formed of a thin film.

An example in which the SAW walls 41 and 42 are formed in the substrate 1 is shown above. However, for example as shown in FIG. 9, the SAW walls may be formed by forming thin films 41' and 42' (for example, alumina ($Al_2O_3$) film or the like) which make the sound velocity of the SAW propagating on the substrate 1 relatively faster, on the surface of the substrate 1, so that the sound velocity of the SAW propagating in the substrate 1 located below the respective thin films 41' and 42' becomes relatively faster.

A second embodiment of the present invention will be described below.

Figure 10:
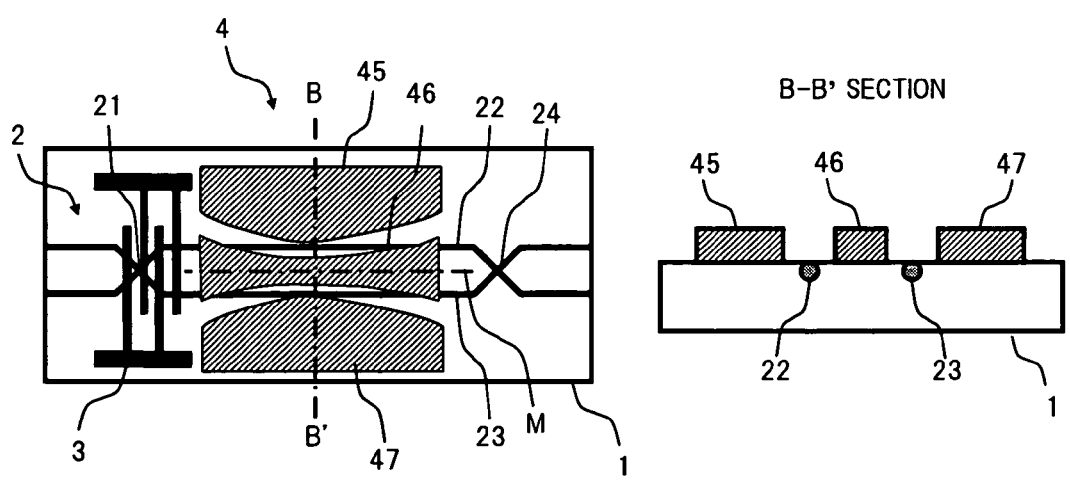
FIG. 10 is a diagram showing the configuration of an optical wavelength tunable filter according to a second embodiment of the present invention.

FIG. 10 is a diagram showing the configuration of an AOTF according to the second embodiment.

In FIG. 10, in the AOTF in the second embodiment, the low sound-velocity areas are formed in the substrate 1 by providing thin films 45, 46 and 47 on the surface of the substrate 1, instead of for example the thin films 43 and 44 in the configuration of the first embodiment shown in FIG. 1. Here a configuration is shown where the pair of SAW walls 41 and 42 is omitted as in the configuration shown in FIG. 8, but the SAW walls may be formed outside of the thin films 45 and 47.

The respective thin films 45, 46 and 47 are formed on other portions of the substrate 1 excluding the portions where the thin films 43 and 44 are formed on the surface of the substrate 1 corresponding to the SAW waveguide 4 in the first embodiment. For the material for the respective thin films 45 to 47, for example, an alumina thin film is used. By forming such thin films 45 to 47 on the surface of the substrate 1, the sound velocity of the SAW propagating in the substrate 1 located below the respective thin films becomes faster than that of the SAW propagating in the portions where the thin films 45 to 47 are not formed. Therefore, the curved belt-shaped areas corresponding to the portions of the substrate 1 where the thin films 45 to 47 are not formed, become the low sound-velocity areas in which the sound velocity of the SAW becomes slow relative to other areas. Accordingly, substantially the same SAW waveguide 4 as in the first embodiment is formed. As a result, by using the respective thin films 45 to 47, the same effects can be obtained as in the first embodiment.

Figure 11:
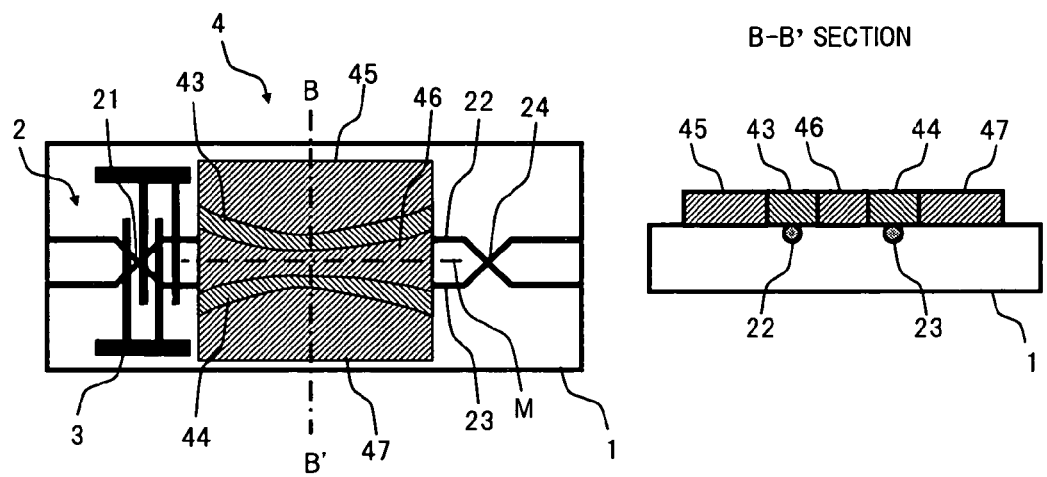
FIG. 11 is a diagram associated with the second embodiment showing an application example in which a combination with the first embodiment is taken into consideration.

As an application example of the second embodiment, for example as shown in FIG. 11, a combination with the first embodiment can also be considered. That is, the low sound-velocity areas in which the sound velocity of the SAW becomes slow relative to other areas may be formed in the substrate 1 by providing both the thin films 43 and 44 that slow the sound velocity, and the thin films 45 to 47 that quickens the sound velocity, on the surface of the substrate 1. Such a configuration is effective for accurately forming the area where the sound velocity of the SAW becomes slower in the substrate 1. In other words, to slow the sound velocity of the SAW propagating in the substrate 1 in the first embodiment, the thickness of the thin films 43 and 44 to be formed on the surface of the substrate 1 needs to be increased. However, an increase in the film thickness deteriorates the pattern accuracy. Therefore, if the thin films 45 to 47 are formed instead of increasing the thickness of the thin films 43 and 44, the relative sound velocity can be made slower, while suppressing an increase in the film thickness. Since the area where the sound velocity is slower has a large SAW confinement effect, there is an advantage in that the exciting power of the SAW can be decreased.

A third embodiment of the present invention will be explained next.

Figure 12:
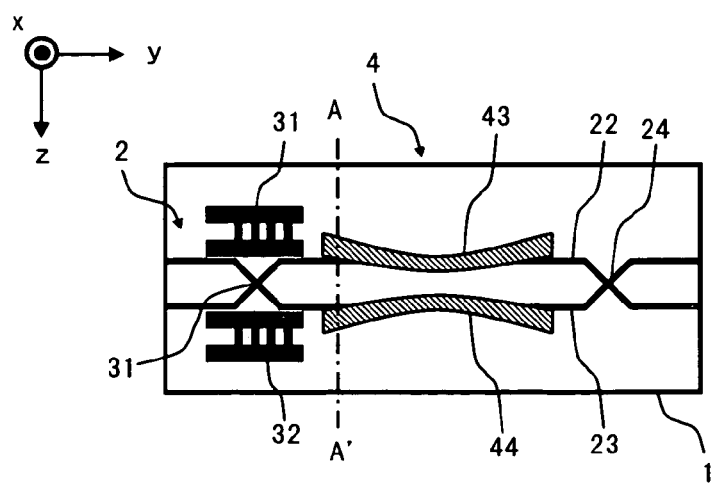
FIG. 12 is a diagram showing the configuration of an optical wavelength tunable filter according to a third embodiment of the present invention.

FIG. 12 is a diagram showing the configuration of an AOTF according to the third embodiment of the present invention.

In FIG. 12, in the AOTF in the third embodiment, a pair of IDTs 31 and 32 obtained by dividing the IDT 3 into two corresponding to the respective thin films 43 and 44 is formed on the surface of the substrate 1, for example in the configuration of the first embodiment shown in FIG. 1. As in the configuration shown in FIG. 8, the pair of SAW walls 41 and 42 are omitted here, but the SAW walls may be formed outside of the thin films 43 and 44.

The respective IDTs 31 and 32 are respectively formed on the surface of the substrate 1 located in the vicinity of one end of the respective thin films 43 and 44. By applying an RF signal (not shown) having a frequency set according to the selected wavelength of the AOTF from the outside, SAWs having wavelengths corresponding to the frequency of the RF signal are respectively generated. The respective phases of the RF signal applied to the respective IDTs 31 and 32 are adjusted so as to have an in-phase or an anti-phase relationship. It is desired to design the AOTF so that the respective IDTs 31 and 32 are arranged on a surface of the substrate 1 different from where the optical waveguide is formed.

In the AOTF having such a configuration, the SAW generated by the respective IDTs 31 and 32 is respectively provided separately to one end of the respective low sound-velocity areas formed in the substrate 1 corresponding to the respective thin films 43 and 44. At this time, when an in-phase RF signal (having a phase difference of 0 or $2\pi$) is applied to the respective IDTs 31 and 32, a SAW having the same mode distribution as that in the first embodiment (see FIG. 3 and FIG. 4) propagates on the SAW waveguide 4, and interacts with the light propagating on the respective arm portions 22 and 23 of the optical waveguide 2. As a result, the same filter property as in the first embodiment can be obtained.

Figure 13:
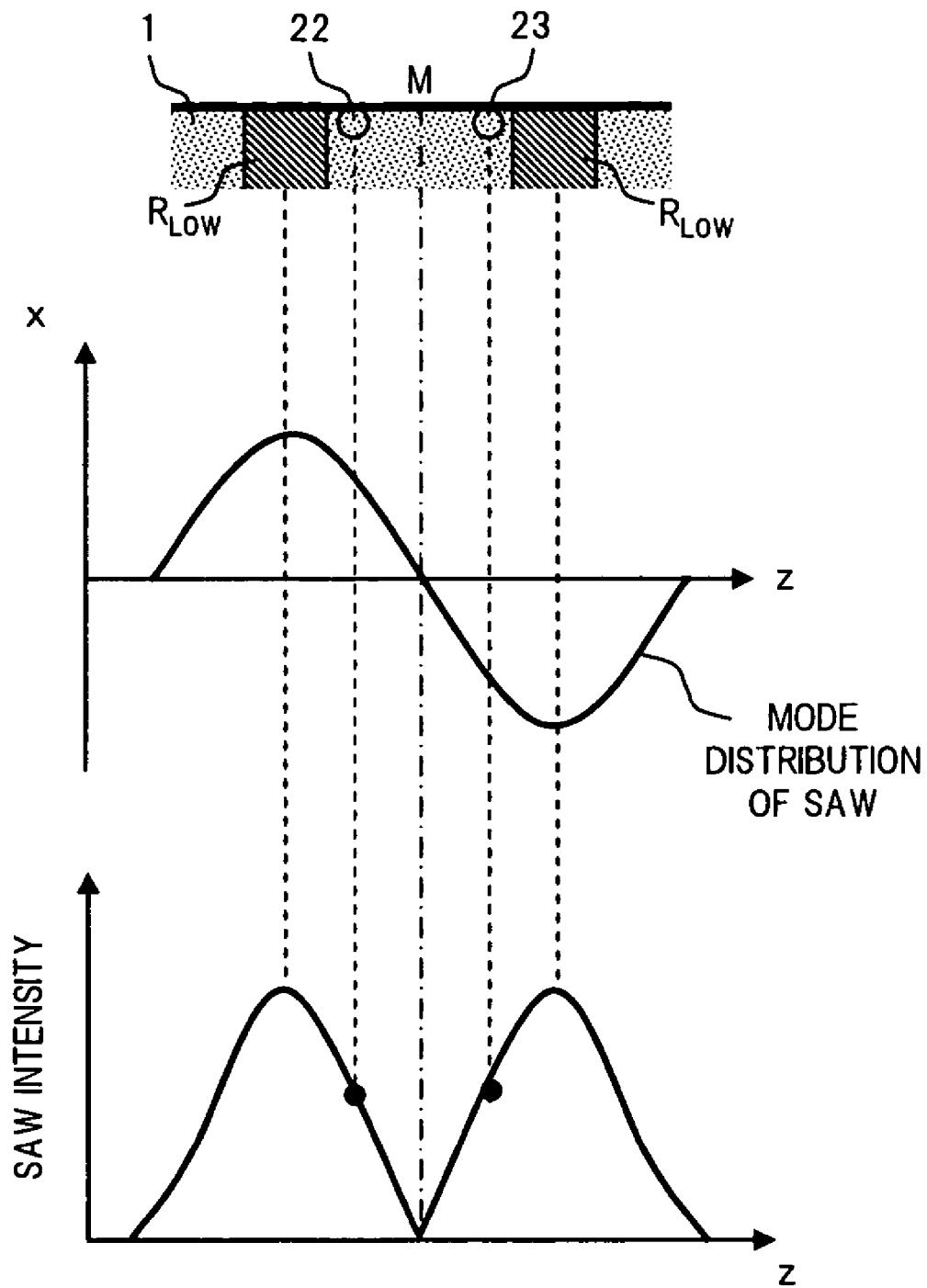
FIG. 13 is a diagram showing the mode distribution and the intensity of the SAW, when an anti-phase RF signal is applied to respective IDTs in the third embodiment.

Moreover, when an anti-phase RF signal (having a phase difference of $\pi$) is applied to the respective IDTs 31 and 32, the mode distribution of the SAW propagating on the SAW waveguide 4 becomes a primary mode, for example as shown in the middle part of FIG. 13, and the mode distribution changes along the y-axis direction as in the first embodiment. The intensity of the SAW having such a mode distribution is maximized at a position corresponding to the respective low sound-velocity areas $R_{LOW}$ as shown in the bottom part in FIG. 13, and becomes substantially zero at the center line M of the respective arm portions 22 and 23 of the optical waveguide 2. Accordingly, the SAW intensity interacting with the light propagating on the optical waveguide 2 becomes similar to the case shown in FIG. 5 with respect to the y-axis direction, and hence the same weighting is performed as in the case in which the in-phase RF signal is applied. As a result, the same filter property as in the first embodiment can be obtained.

According to the AOTF in the third embodiment, the same effect as in the first embodiment can be obtained. Moreover, since the IDTs 31 and 32 are provided individually corresponding to the respective thin films 43 and 44, a coupling loss of the SAW guided to the one end of the low sound-velocity areas $R_{LOW}$ corresponding to the respective thin films 43 and 44 can be reduced more than in the first embodiment. As a result, the exciting power of the SAW can be reduced. Furthermore, if an anti-phase RF signal is applied to the respective IDTs 31 and 32 as shown in FIG. 13, the SAW intensity in the vicinity of the center line M, which does not substantially contribute to the interaction with the light propagating on the optical waveguide 2, is minimized. As a result, the exciting power of the SAW can be reduced more effectively. Furthermore, since the respective IDTs 31 and 32 are arranged on a surface of the substrate 1 different from where the optical waveguide is formed, noise generated by the AOTF can be reduced. In other words, since the wavelength of the light mode-converted (selected) by the IDT is different from that of the light mode-converted in the SAW waveguide 4, arrangement of the IDT on the optical waveguide of the substrate 1 becomes a noise factor, but in the AOTF in which the IDT is divided into two, a configuration is possible where the noise factor is eliminated.

In the third embodiment, an example in which the IDT is divided into two in the configuration of the first embodiment is shown. However, this configuration can be applied to the configuration of the second embodiment as well. Moreover, the respective IDTs 31 and 32 are arranged on a surface of the substrate 1 different from where the optical waveguide is formed, but if the noise is inconsiderable, the respective IDTs may be arranged at positions overlapping on the optical waveguide on the substrate 1.

A fourth embodiment of the present invention will be described below.

Figure 14:
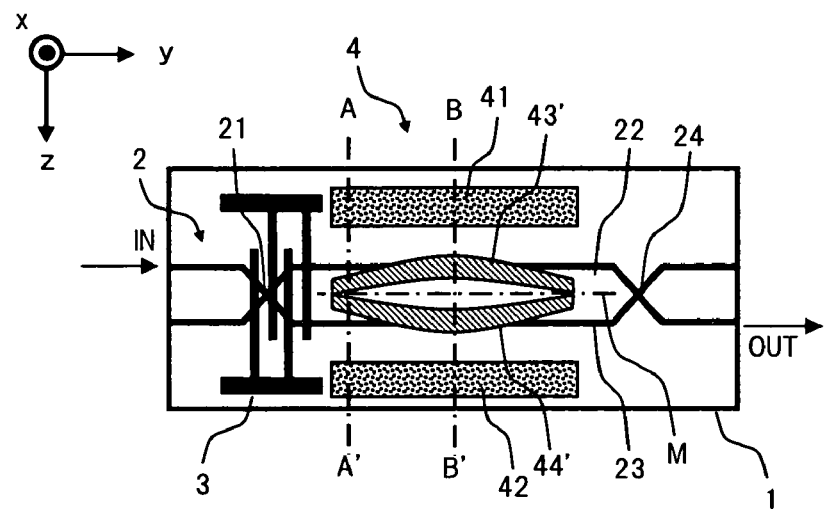
FIG. 14 is a top view showing the configuration of an optical wavelength tunable filter according to a fourth embodiment of the present invention.

FIG. 14 is a top view showing the configuration of an AOTF according to the fourth embodiment of the present invention. Moreover FIG. 15 is a diagram showing the configuration of the A-A' section and the B-B' section in FIG. 14.

Figure 15:
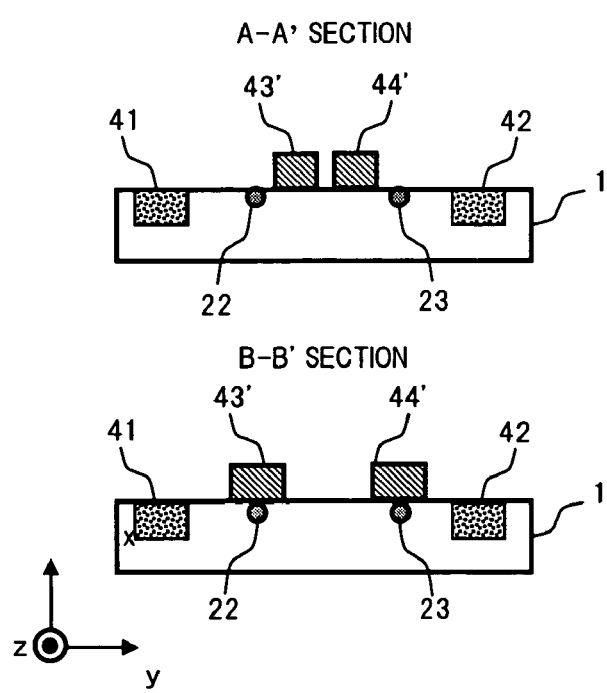
FIG. 15 is a diagram showing the configuration of the A-A' section and the B-B' section in FIG. 14.

In FIG. 14 and FIG. 15, the AOTF in the fourth embodiment is a modified example of the configuration of the first embodiment shown in FIG. 1, with thin films 43' and 44' obtained by changing the curved shape of the thin films 43 and 44, formed on the surface of the substrate 1.

Figure 16:
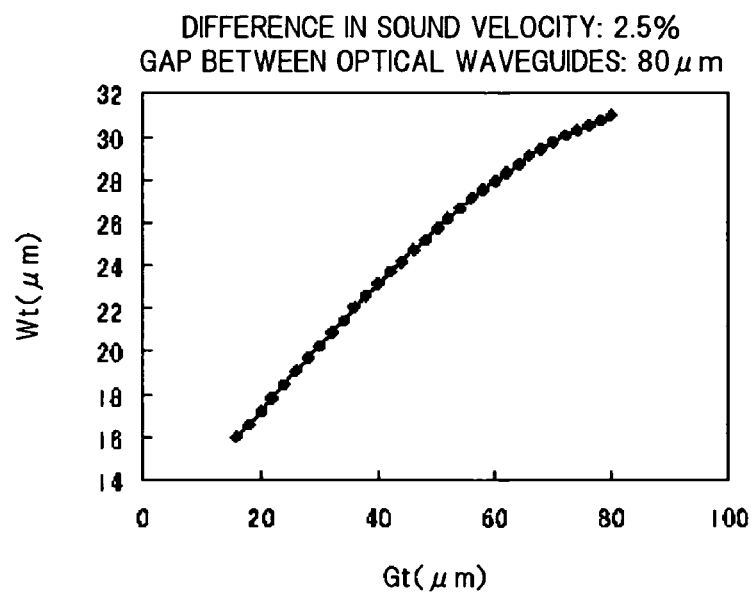
FIG. 16 is a diagram showing one example of calculation of the relation between the width of and the gap between the low sound-velocity areas for keeping the sound velocity of the SAW constant in the fourth embodiment.

The central portions in the longitudinal direction of the respective thin films 43' and 44' are located on the respective arm portions 22 and 23 of the optical waveguide 2, and the opposite end portions are located inside of the respective arm portions 22 and 23 of the optical waveguide 2, so that the shape of the pair arranged symmetrically with respect to the center line M of the respective arm portions 22 and 23 of the optical waveguide 2 is approximately a barrel shape. With the thin films 43' and 44' having such a shape, the gap Gt between a pair of low sound-velocity areas, and the respective widths Wt need only to be designed according to the relation shown for example in FIG. 16, in order to keep constant the sound velocity of the SAW propagating on the respective low sound-velocity areas formed below the respective thin films. The example shown in FIG. 16 shows a calculation result when the gap between the respective arm portions 22 and 23 of the optical waveguide 2 is 80 μm, and the low sound-velocity areas $R_{LOW}$ in which the sound velocity of the SAW becomes slow by 2.5% are formed. However, it does not mean that the present invention is limited to the above specific examples.

Figure 17:
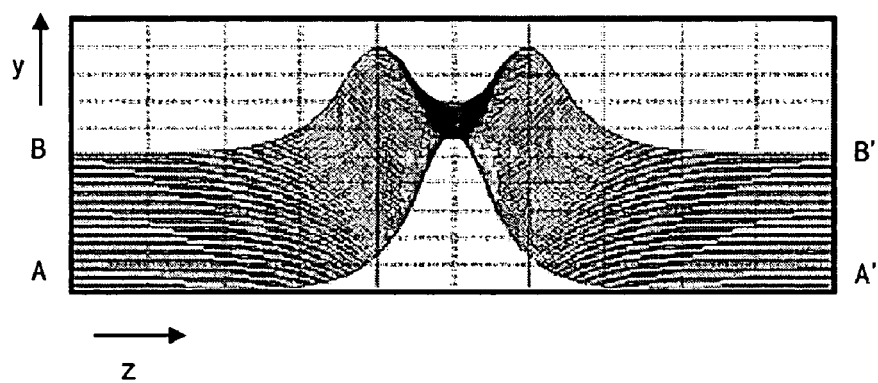
FIG. 17 is a diagram showing the result of continuous calculation of the mode distribution of the SAW from the A-A' section to the B-B' section in the fourth embodiment.
Figure 18:
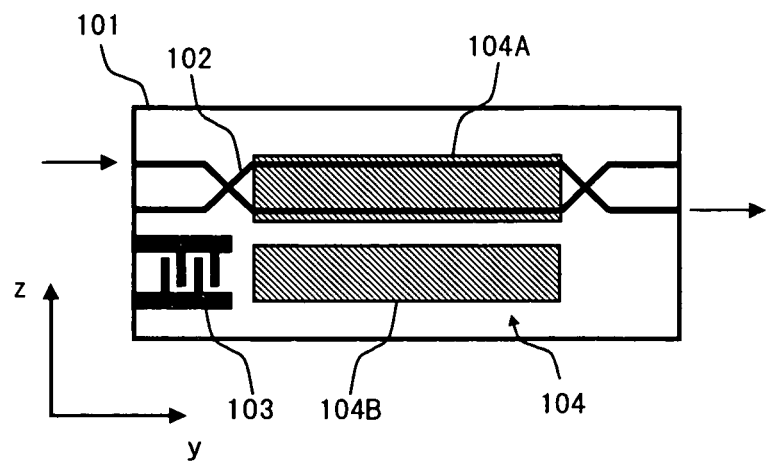
FIG. 18 is a block diagram showing one example of the conventional AOTF using a SAW directional coupler.
Figure 19:
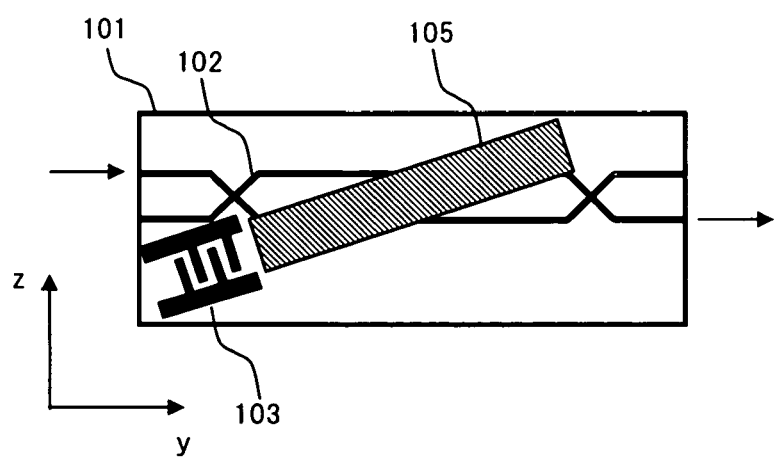
FIG. 19 is a block diagram showing one example of the conventional AOTF using an oblique SAW guide.
Figure 20:
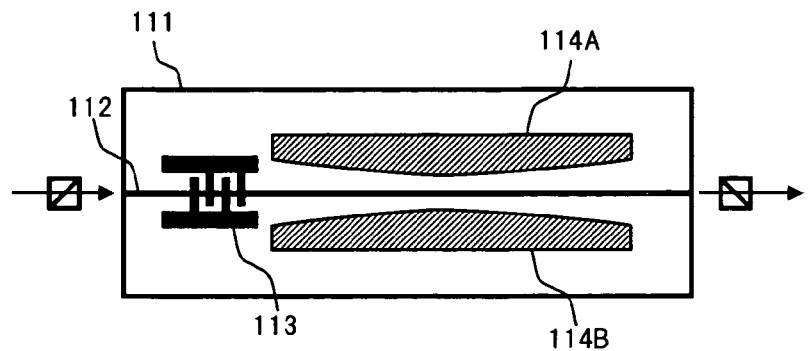
FIG. 20 is a block diagram showing one example of the conventional AOTF using a curved SAW guide.
Figure 21:
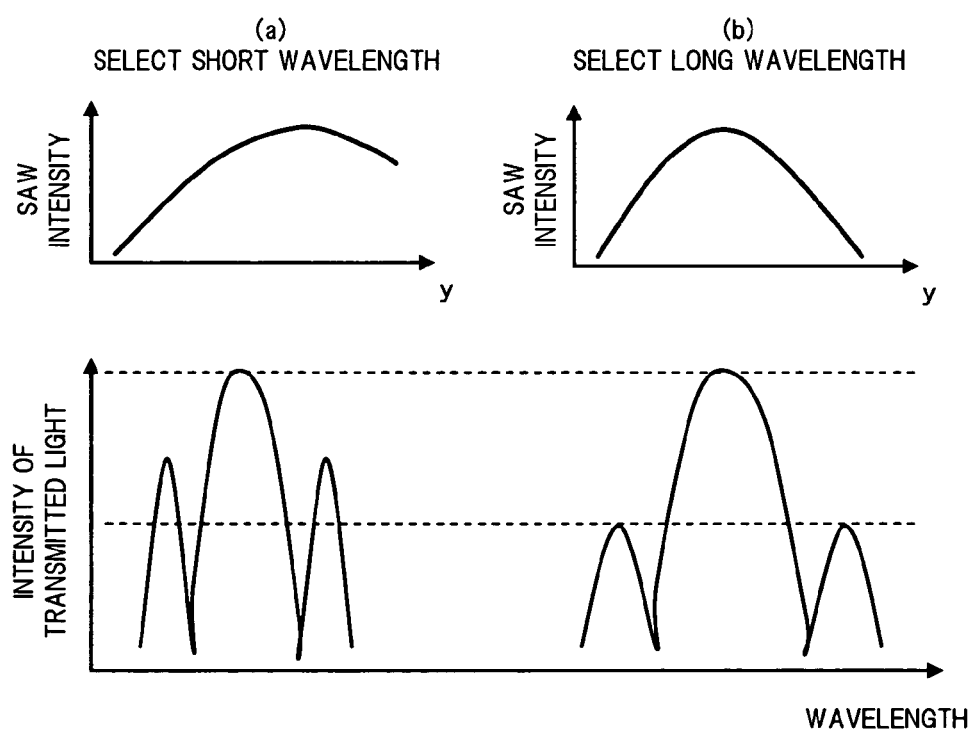
FIG. 21 is a diagram for explaining problems in the conventional AOTF using the SAW directional coupler.
Figure 22:
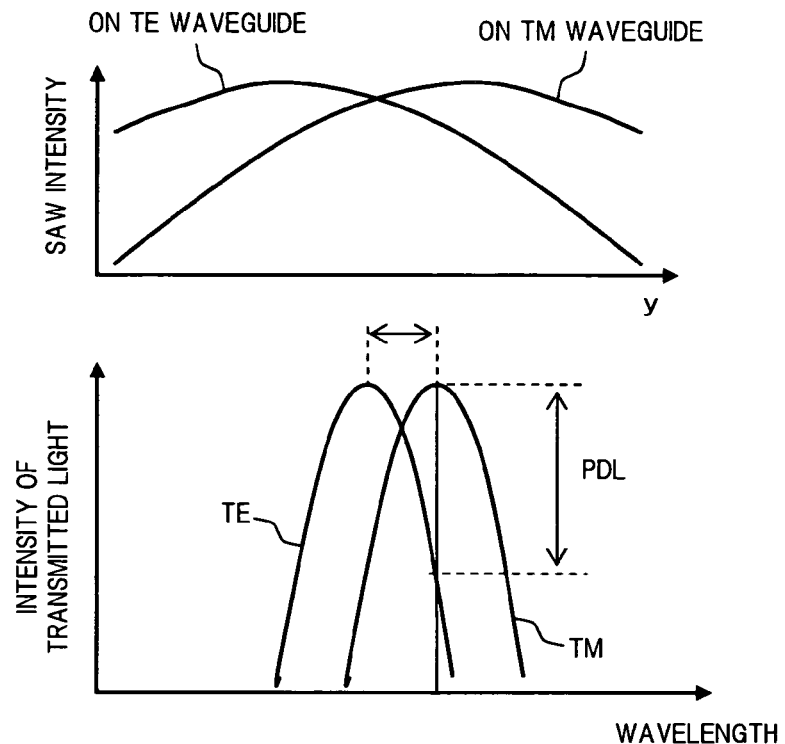
FIG. 22 is a diagram for explaining problems in the conventional AOTF using the oblique SAW guide.
Figure 23:
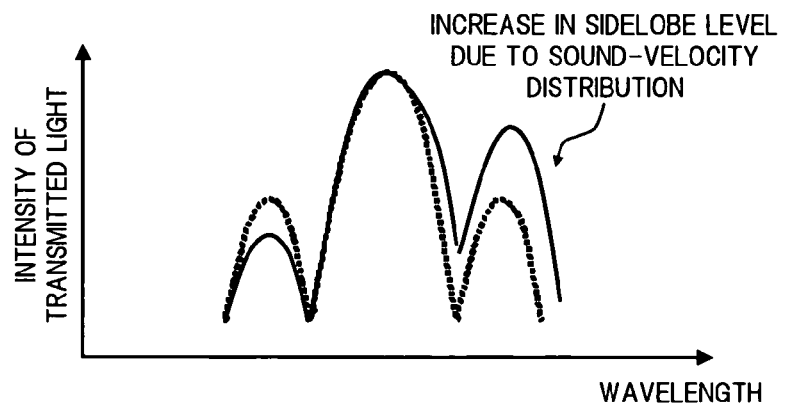
FIG. 23 is a diagram for explaining problems in the conventional AOTF using the curved SAW guide.

FIG. 17 shows an example in which the mode distribution of the SAW propagating on the SAW waveguide 4 in which the respective thin films 43' and 44' are formed, is calculated continuously from the A-A' section to the B-B' section. Here the calculation of the mode distribution assumes that the respective thin films 43' and 44' (the low sound-velocity areas) have an approximately straight shape, bended at their central portions. Thus, the mode distribution of the SAW propagating on the SAW waveguide 4 has a peak at the center in the z-axis direction on the A-A' section, and the intensity of the SAW interacting with the light propagating on the optical waveguides 22 and 23 becomes relatively low. Moreover, as the SAW propagates in the y-axis direction, the peak in the mode distribution separates into two, with the gap gradually increasing, so that the respective peaks are located on the optical waveguides 22 and 23 on the B-B' section. The change in the mode distribution from the B-B' section to the end opposite to the A-A' section has a symmetric relationship to that of FIG. 17, and hence illustration is herein omitted.

According to the AOTF in the fourth embodiment, when the pair of thin films 43' and 44' having an approximate barrel shape are formed on the surface of the substrate 1, the wavelength dependence and the polarization dependence of the filter property, and an increase in sidelobe level resulting from the sound-velocity distribution in the SAW propagation mode can be solved, as in the first embodiment. Moreover, since the low sound-velocity areas located at one end of the SAW waveguide 4 are arranged near the center of the IDT 3, a coupling loss of the SAW guided from the IDT 3 to the low sound-velocity areas can be reduced.

In the fourth embodiment, a modification example in which the pair of thin films (the low sound-velocity areas) has a barrel shape is shown with respect to the configuration in the first embodiment, but a similar modification is also possible with respect to the configuration in the second embodiment.

What is claimed is:

1. An optical wavelength tunable filter comprising:
a substrate having an acousto-optic effect;
an optical waveguide formed on said substrate;
a surface acoustic wave generating unit that generates a surface acoustic wave on said substrate; and
a single surface acoustic waveguide, to one end of which a surface acoustic wave from said surface acoustic wave generating unit is provided, so as to propagate said surface acoustic wave along said optical waveguide, wherein
said optical waveguide comprises: a separation section for separating a light input to an input port into two polarized waves; two parallel arm portions respectively provided with the light separated by said separation section; and a mode conversion section for converting the polarization mode of the selected light which has propagated on said respective arm portions, and outputting the selected light from an output port,
said surface acoustic waveguide is positioned symmetrically with respect to a straight line as an axis passing through the middle of the respective arm portions of said optical waveguide, and has a pair of low sound-velocity areas, said respective low sound-velocity areas having a curved shape with widths corresponding to a gap between said pair of low sound-velocity areas, and
said surface acoustic wave propagating in said surface acoustic waveguide includes an area in which a mode distribution of a propagating surface acoustic wave changes symmetrically with respect to a straight line as an axis passing through the middle of the respective arm portions of said optical waveguide, while keeping the sound velocity of the surface acoustic wave constant, so that the intensity of the surface acoustic wave interacting with the light propagating on the respective arm portions of said optical waveguide changes with respect to a propagation direction of the light.

2. An optical wavelength tunable filter according to claim 1, wherein said respective low sound-velocity areas are such that a central portion thereof in the longitudinal direction overlaps on the respective arm portions of said optical waveguide, and opposite end portions are located outside of the respective arm portions of said optical waveguide.

3. An optical wavelength tunable filter according to claim 1, wherein said respective low sound-velocity areas are such that a central portion thereof in the longitudinal direction overlaps on the respective arm portions of said optical waveguide, and opposite end portions are located inside of the respective arm portions of said optical waveguide.

4. An optical wavelength tunable filter according to claim 1, wherein said respective low sound-velocity areas are obtained by forming a thin film, which slows the sound velocity of the surface acoustic wave propagating on said substrate, on the surface of said substrate corresponding to said low sound-velocity areas.

5. An optical wavelength tunable filter according to claim 1, wherein said respective low sound-velocity areas are obtained by forming a thin film, which quickens the sound velocity of the surface acoustic wave propagating on the surface of said substrate, on the surface of said substrate excluding the surface corresponding to said low sound-velocity areas.

6. An optical wavelength tunable filter according to claim 1, wherein said respective low sound-velocity areas are obtained by forming a thin film, which slows the sound velocity of the surface acoustic wave propagating on said substrate, on the surface of said substrate corresponding to said low sound-velocity areas, and forming a thin film, which quickens the sound velocity of the surface acoustic wave propagating on the surface of said substrate, on the other surface of said substrate.

7. An optical wavelength tunable filter according to claim 1, wherein said surface acoustic wave generating unit has one interdigital transducer, which excites the surface acoustic wave commonly provided to the one end of said respective low sound-velocity areas.

8. An optical wavelength tunable filter according to claim 1, wherein said surface acoustic wave generating unit has a pair of interdigital transducers which excites an in-phase surface acoustic wave, individually provided to the one end of said respective low sound-velocity areas.

9. An optical wavelength tunable filter according to claim 8, wherein said pair of interdigital transducers are arranged on a surface of said substrate different from where said optical waveguide is formed.

10. An optical wavelength tunable filter according to claim 1, wherein said surface acoustic wave generating unit has a pair of interdigital transducers which excites an anti-phase surface acoustic wave, individually provided to the one end of said respective low sound-velocity areas.

11. An optical wavelength tunable filter according to claim 10, wherein said pair of interdigital transducers are arranged on a surface of said substrate different from where said optical waveguide is formed.

12. An optical wavelength tunable filter comprising:
a substrate having an acousto-optic effect;
an optical waveguide formed on said substrate;
a surface acoustic wave generating unit that generates a surface acoustic wave on said substrate; and
a single surface acoustic waveguide, to one end of which a surface acoustic wave from said surface acoustic wave generating unit is provided, so as to propagate said surface acoustic wave along said optical waveguide, wherein
said optical waveguide comprises: a separation section for separating a light input to an input port into two polarized waves; two parallel arm portions respectively provided with the light separated by said separation section; and a mode conversion section for converting the polarization mode of the selected light which has propagated on said respective arm portions, and outputting the selected light from an output port,
said surface acoustic waveguide is positioned symmetrically with respect to a straight line as an axis passing through the middle of the respective arm portions of said optical waveguide, and has a pair of low sound-velocity areas, said respective low sound-velocity areas having a curved shape so that the widths of said low sound-velocity areas are set according to a gap provided in an entirety of area between said pair of low sound-velocity areas, and
said surface acoustic wave propagating in said surface acoustic waveguide includes an area in which a mode distribution of a propagating surface acoustic wave changes symmetrically with respect to a straight line as an axis passing through the middle of the respective arm portions of said optical waveguide, while keeping the sound velocity of the surface acoustic wave constant, so that the intensity of the surface acoustic wave interacting with the light propagating on the respective arm portions of said optical waveguide changes with respect to a propagation direction of the light.

* * * * *